United States Patent
Todd

(10) Patent No.: US 8,484,724 B2
(45) Date of Patent: Jul. 9, 2013

(54) USER PERMISSIONS IN COMPUTING SYSTEMS

(75) Inventor: Paul H. Todd, Sherman, TX (US)

(73) Assignee: Bank of America Corporation, Charlotte, NC (US)

( * ) Notice: Subject to any disclaimer, the term of this patent is extended or adjusted under 35 U.S.C. 154(b) by 372 days.

(21) Appl. No.: 12/845,881

(22) Filed: Jul. 29, 2010

(65) Prior Publication Data
US 2012/0030756 A1 Feb. 2, 2012

(51) Int. Cl.
*G06F 21/00* (2006.01)

(52) U.S. Cl.
USPC .......................................................... 726/21

(58) Field of Classification Search
USPC ................................................ 726/4, 21–28
See application file for complete search history.

(56) References Cited

U.S. PATENT DOCUMENTS

| | | | | |
|---|---|---|---|---|
| 6,546,392 | B1 * | 4/2003 | Bahlmann | 1/1 |
| 7,249,262 | B2 * | 7/2007 | Hauck et al. | 713/184 |
| 7,756,816 | B2 * | 7/2010 | Scott | 1/1 |
| 7,865,950 | B2 * | 1/2011 | Lipetz | 726/19 |
| 7,904,716 | B2 * | 3/2011 | Dokuni | 713/168 |
| 7,992,008 | B2 * | 8/2011 | Ashok et al. | 713/183 |
| 8,060,932 | B2 * | 11/2011 | Mohammed et al. | 726/21 |
| 8,204,900 | B2 * | 6/2012 | Gatton et al. | 707/769 |
| 2001/0054153 | A1 * | 12/2001 | Wheeler et al. | 713/185 |
| 2002/0032781 | A1 * | 3/2002 | Yoshida et al. | 709/228 |
| 2002/0052773 | A1 * | 5/2002 | Kraemer et al. | 705/9 |
| 2003/0208562 | A1 * | 11/2003 | Hauck et al. | 709/219 |
| 2004/0068517 | A1 * | 4/2004 | Scott | 707/104.1 |
| 2005/0109834 | A1 * | 5/2005 | Grindel et al. | 235/379 |
| 2005/0114673 | A1 * | 5/2005 | Raikar et al. | 713/182 |
| 2005/0144482 | A1 * | 6/2005 | Anuszewski | 713/201 |
| 2006/0053125 | A1 * | 3/2006 | Scott | 707/100 |
| 2007/0250920 | A1 * | 10/2007 | Lindsay | 726/7 |
| 2008/0051064 | A1 * | 2/2008 | Jones et al. | 455/412.2 |
| 2008/0109898 | A1 * | 5/2008 | Mohammed et al. | 726/21 |
| 2008/0183717 | A1 * | 7/2008 | Singh et al. | 707/10 |
| 2008/0196090 | A1 * | 8/2008 | Baron et al. | 726/5 |
| 2008/0301781 | A1 * | 12/2008 | Ferrara et al. | 726/4 |
| 2008/0320310 | A1 * | 12/2008 | Florencio et al. | 713/184 |
| 2009/0064285 | A1 * | 3/2009 | Takahashi | 726/4 |
| 2009/0199294 | A1 * | 8/2009 | Schneider | 726/18 |
| 2009/0259588 | A1 * | 10/2009 | Lindsay | 705/40 |
| 2010/0064375 | A1 * | 3/2010 | Gorczowski et al. | 726/28 |
| 2010/0162401 | A1 * | 6/2010 | Sakaki | 726/25 |
| 2011/0055898 | A1 * | 3/2011 | Jou et al. | 726/3 |
| 2011/0283138 | A1 * | 11/2011 | Sangubhatla et al. | 714/15 |
| 2012/0090037 | A1 * | 4/2012 | Levit | 726/28 |
| 2012/0179962 | A1 * | 7/2012 | Hendricks et al. | 715/273 |

* cited by examiner

*Primary Examiner* — Michael S McNally
(74) *Attorney, Agent, or Firm* — Banner & Witcoff, Ltd.; Michael A. Springs

(57) ABSTRACT

A system and method of verifying accuracy of permission and access levels in a mainframe system are presented. The system and method may include receiving a plurality of records including a user identifier and an associated access level. The access level in the record may be matched (e.g., the access level on the stored record must be less than or equal to the access on the new system to "pass" the test) to the access level in a mainframe system. If the access levels match, the access level may be stored in the mainframe system. If the access levels do not match, the record may be flagged and correction of the inconsistency may be performed.

15 Claims, 6 Drawing Sheets

USER PERMISSIONS IN COMPUTING SYSTEMS

BACKGROUND

Secure access to computer systems is an important part of running any type of business, government agency, and the like. In addition, providing access to appropriate individuals within an organization may aid in efficient work within the organization. However, when computer systems are changed, upgraded, altered, and the like, the access permitted for each user may be stored incorrectly in the new system. Conventional systems may verify the access levels in the new system by individually loading each access level and associated user into the new system or individually checking each access level of each user within the new system. This method can be time consuming, inefficient, and may lead to errors and inaccurate results. Accordingly, a system and method of verifying the permissions and/or access levels, for instance, at a mainframe computer system, would be advantageous.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

According to one or more aspects, a system and method of verifying user permissions and/or access to a computer system are provided. In some examples, the computer system may be a mainframe computer or server. Additionally, the system and method may include receiving a plurality of records at a permissions verification system. The records may include user identifiers and an associated access level (e.g., for each user identifier) for a first mainframe system. The access level associated with the user identifier may be matched with an access level associated with the user identifier on a second mainframe system. If the access levels match, the record may be stored on the second mainframe system. If the access levels do not match, the record may be flagged and a user or administrator may be prompted to correct the inconsistency between the access level of the record and the access level of the second mainframe system. Once the inconsistency is corrected, the access level may be stored at the second mainframe system.

Additional aspects may relate to a system and method of verifying that a password meets a desired level of security. For instance, a permissions verification system may attempt to login to a computing system, such as a mainframe system, using a user identifier and a default password that had been associated with the user identifier upon creation of the user identifier. If the login is successful, a notification may be transmitted to a user associated with the user identifier that the password does not meet the desired security level and may include a request to change the password.

BRIEF DESCRIPTION OF THE DRAWINGS

The present disclosure is illustrated by way of example and not limited in the accompanying figures in which like reference numerals indicate similar elements.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
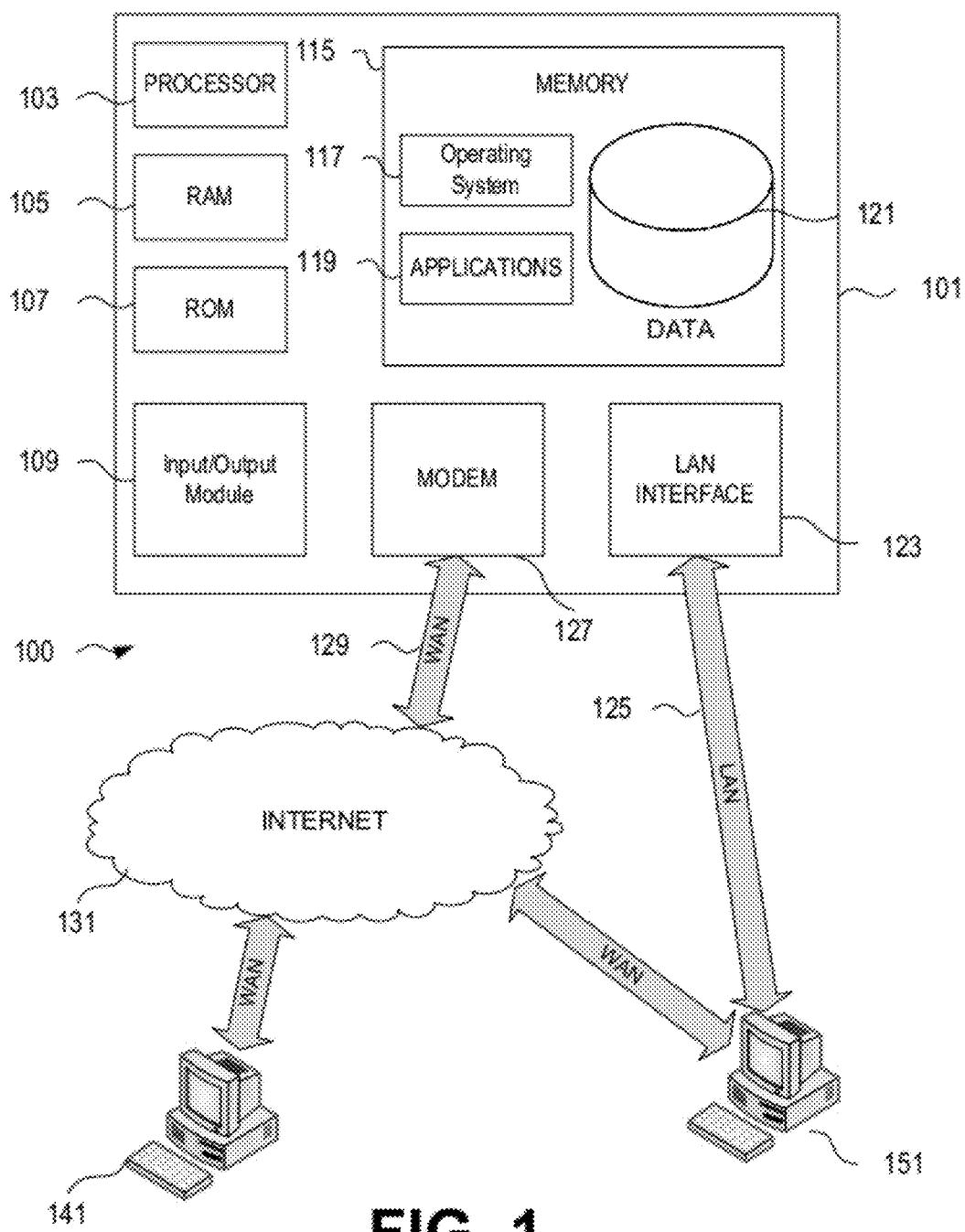
FIG. 1 illustrates an example of a suitable operating environment in which various aspects of the disclosure may be implemented.

FIG. 1 illustrates a block diagram of a generic computing device 101 (e.g., a computer server) in computing environment 100 that may be used according to an illustrative embodiment of the disclosure. The computer server 101 may have a processor 103 for controlling overall operation of the server and its associated components, including random access memory (RAM) 105, read-only memory (ROM) 107, input/output (I/O) module 109, and memory 115.

I/O 109 may include a microphone, mouse, keypad, touch screen, scanner, optical reader, and/or stylus (or other input device(s)) through which a user of server 101 may provide input, and may also include one or more of a speaker for providing audio output and a video display device for providing textual, audiovisual and/or graphical output. Software may be stored within memory 115 and/or other storage to provide instructions to processor 103 for enabling server 101 to perform various functions. For example, memory 115 may store software used by the server 101, such as an operating system 117, application programs 119, and an associated database 121. Alternatively, some or all of server 101 computer executable instructions may be embodied in hardware or firmware (not shown).

The server 101 may operate in a networked environment supporting connections to one or more remote computers, such as terminals 141 and 151. The terminals 141 and 151 may be personal computers or servers that include many or all of the elements described above relative to the server 101. The network connections depicted in FIG. 1 include a local area network (LAN) 125 and a wide area network (WAN) 129, but may also include other networks. When used in a LAN networking environment, the computer 101 may be connected to the LAN 125 through a network interface or adapter 123. When used in a WAN networking environment, the server 101 may include a modem 127 or other network interface for establishing communications over the WAN 129, such as the Internet 131. It will be appreciated that the network connections shown are illustrative and other means of establishing a communications link between the computers may be used.

The existence of any of various well-known protocols such as TCP/IP, Ethernet, FTP, HTTP, HTTPS, and the like is presumed.

Computing device 101 and/or terminals 141 or 151 may also be mobile terminals (e.g., mobile phones, PDAs, notebooks, and the like) including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, and the like that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices.

Although the invention may be described in terms of use with a mainframe system, aspects of the disclosure may be used in conjunction with various computer systems not limited to solely mainframe type systems. Accordingly, nothing in the specification should be viewed as limiting the invention to use only with mainframe systems. Further, the systems and methods described herein may be used in a variety of industries, companies, entities, and the like including the financial services industry, and the like.

When a new computer system, such as a mainframe system is installed, or when systems are merged, processes may be performed to verify the validity of the new system and to replicate data stored in a previous system on the new system. For instance, the user permissions available in the new system (e.g., permissions that may be loaded prior to the verification process) may be validated against those of the old system or systems. User permissions may include access to data or a dataset associated with a user or user identifier, such as an employee number, user identification number, and the like. Other permissions may include objects that may provide protection for computer resources other than datasets, such as RACF general resources or other similar computer resources. Accordingly, the permissions of the previous system may be compared with those of the new system, such as in a batch review, in order to confirm that the permissions are accurate.

Figure 2:
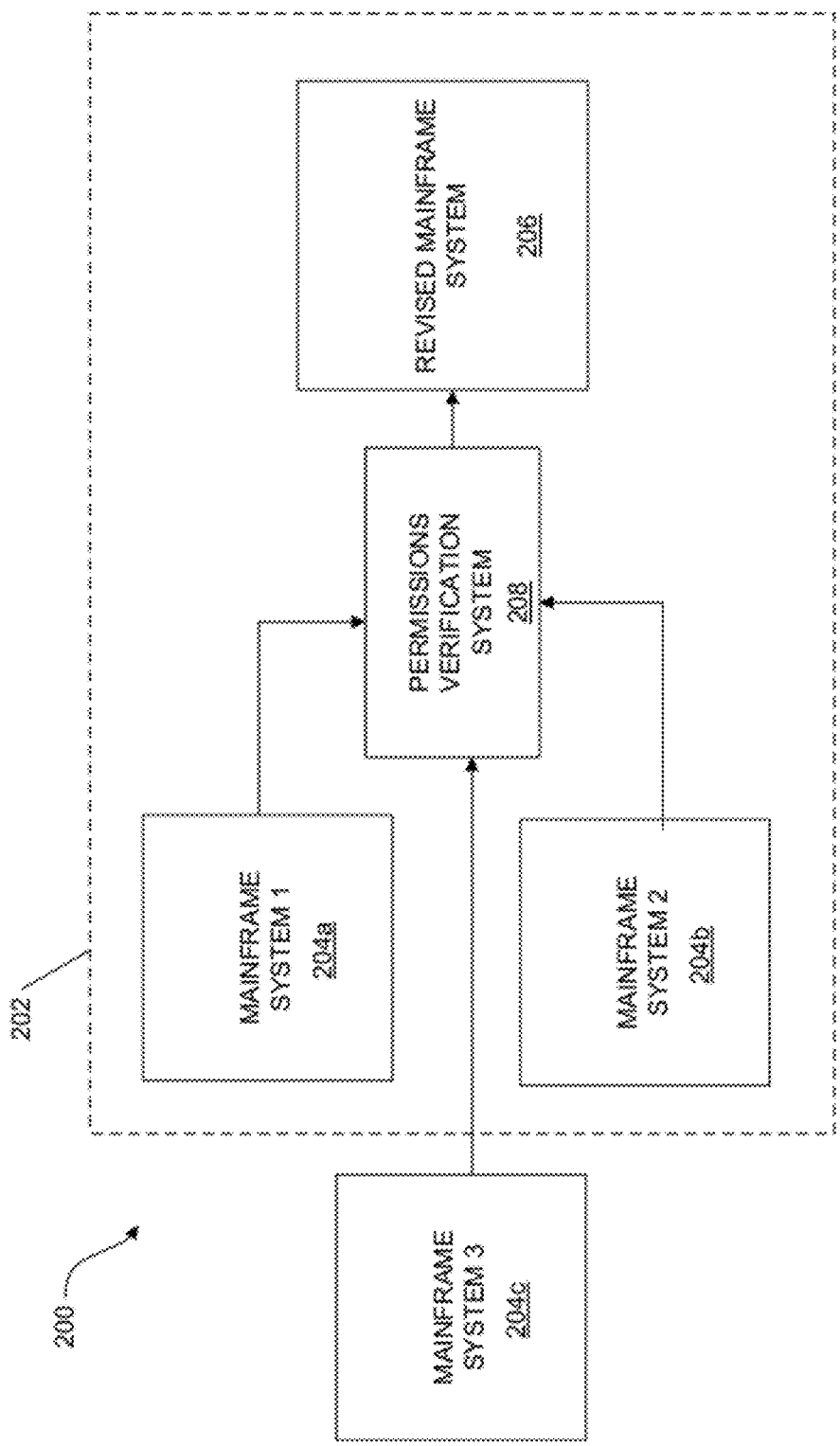
FIG. 2 illustrates an example system for verifying user permissions in a mainframe system according to one or more aspects described herein.

FIG. 2 illustrates one example system for verifying and/or validating user permissions in a mainframe system. The system 200 may include one or more mainframe systems 204a-204c. In some examples, the mainframe systems 204a-204c may be mainframe systems that are being merged (either with each other or with another system), are systems being replaced, are systems being backed up with another system, and the like. The one or more mainframe systems 204a-204c may be located within and/or associated with the company or entity using the data stored on the systems or associated with the revised mainframe system, such as entity 200. Additionally or alternatively, one or more mainframe systems, such as mainframe system 204c may be external to or not associated with the entity 202. For instance, mainframe system 204c may be an external data warehouse or other entity that may store and provide data to the entity 202. In some examples, the entity 202 may be a bank or other financial institution and the mainframe system 204c may be a database not associated with the bank or financial institution but that provides data to the bank.

The system 200 may also include a revised mainframe system 206. The revised mainframe system 206 may be a new system or existing system that will now accommodate the merged mainframe systems (such as systems 204a-204c) or another system which may be being replaced. The revised mainframe system 206 may store information similar to or the same as the other mainframe systems 204a-204c. In order to confirm that the user permissions, access, and the like is correct and accurate in the revised mainframe system, the system 200 may include a permissions verification system 208. The permissions verification system 208 may be connected to the mainframe systems 204a-204c and/or the revised mainframe system 206. In some examples, the permissions verification system 208 may review the permissions associated with various users of the systems and confirm that the permissions provided in the revised mainframe system 206 are accurate.

For example, in one arrangement, a plurality of records may be created indicating a user, an access level and a resource. In some examples, a resource may be an object such as a dataset, application transaction, program or another user. The user may be identified by a user identification, as discussed above. The access level (e.g., read, write, update, alter, and the like) may be for a particular dataset, for accessing one or more functions, for the system generally, for a particular job, and the like. In some arrangements, the records may be collected from various systems and may be in various formats (including SMF, TSS, and the like). The records from various systems and formats may be loaded into the permissions verification system 208 and the system 208 may process the access levels, user identifier and/or resource (e.g., permissions) associated with each record. In arrangements in which records are received in various formats, some or all records may be formatted into a common record format or layout prior to processing. In some examples, the records may be collected over a period of time in order to obtain a broad spectrum of users, and the like. For instance, as users log into and gain access to resources on the existing system, a record may be created of the user (user identification) and the permission or access level, as well as the resource accessed. These records may be collected and stored for input into the permissions verification system 208.

The collected records may be loaded as a batch, such that all records, or a subset of the records collected, may be verified as a whole, rather than having to input each individual record or user. This arrangement may allow for more efficient verification of the permissions, as well as fewer errors and inaccuracies that may occur when loading each record individually.

In some examples, and as will be discussed more fully below, the records loaded into the permissions verification system 208 may be matched against the permissions found in the revised mainframe system 206. If the user identifier, resource and/or access level matches, that is, if the user identifier has at least the same or higher permission in the new or revised system than in the existing system, or, alternatively, if the user identifier does not have permission in the existing system and does not have permission in the revised system, the permission will not be flagged (or if the permission levels are the same in a multi-permission level arrangement). However, if the permissions do not match (e.g., the user has a lesser or lower access level in the new or revised system than in the existing record), an alert or flag may be raised to indicate an error in one or more systems. The alert may be sent to a user terminal or other computing device (not shown) to allow for correction of the error as desired.

Figure 3:
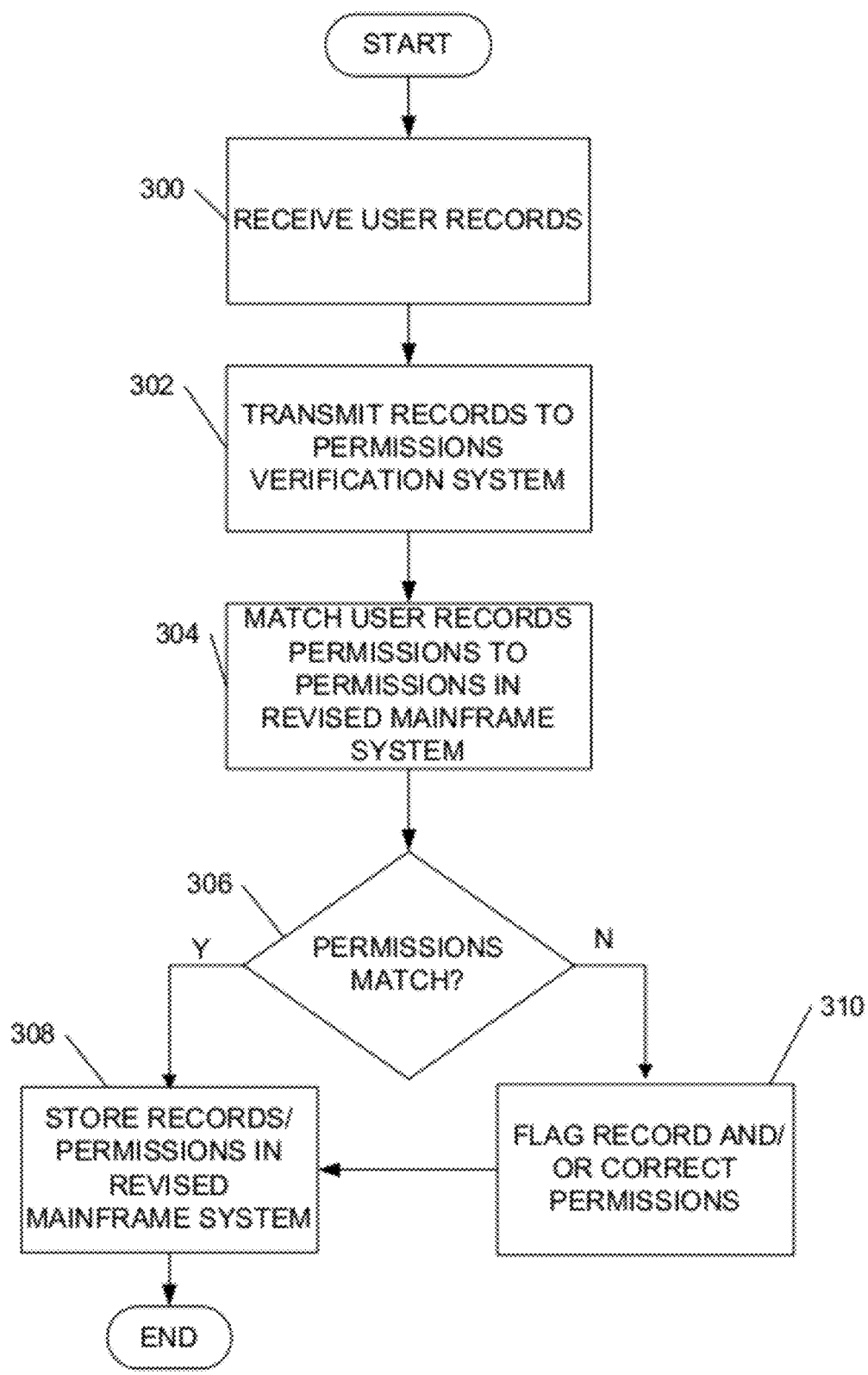
FIG. 3 illustrates one example method of verifying user permissions in a mainframe system according to one or more aspects described herein.

FIG. 3 illustrates one example method of verifying user permissions in a mainframe system.

In step 300, user records are received. As discussed above, the records may be collected over a predetermined time frame, such as one week, one month, one year, and the like. The records may be received from varying systems or types of systems and in varying formats and, as needed, may be reformatted for processing. In step 302, the records are transmitted to the permissions verification system. As discussed above, this system may be in communication with the existing mainframe systems, as well as the "new" or revised mainframe system.

In step 304, a match is attempted between the permissions within the record and the permissions in the revised mainframe system. In step 306, a determination is made as to whether the access level or permission in the record matches the associated permission in the revised mainframe system. In some examples, a match may include the access on the new system is equal to or greater than the access requested on the collected records. For instance, if a user has read access in the collected record, and update access in the new or revised system (update access being greater than read access and including read access), that would be considered a match in some arrangements. In some alternate arrangements, a match may occur if the requested permission on the record is equal to the permission on the new or revised system. For instance, if a user has alter access in the record and has alter access on the new system, a match would occur. However, in this arrangement, if a user has alter access in the record and read access in the new system, a match would not occur. In still other arrangements, a match may occur if the permissions on the new or revised system are less than or equal to the permissions in the record. For instance, if a user has requested read access in the record (and had read and write access on the old or existing system) and has only read access in the new system, a match would occur. In still other arrangements, a match may not occur if the permissions on the new or revised system are different from the permissions on the record. For instance, if the user has requested read access in the record (and had read and write access on the old or existing system) and had only write access in the new system, a match would not occur because write access does not include read access, in some examples.

If the permissions or access in the record match those in the revised mainframe system, the permission in the new system is then considered valid and no correction is necessary or required, as shown in step 308. However, if permissions or access do not match (e.g., the requested access on the collected data record is greater than the access on the revised or new mainframe system as compared to some examples of a match above), the record will be flagged and a user or administrator may be prompted to correct the error in access level on the new or revised system for that user identification number in step 310. Flagging may include adding an indicator to a listing of permissions, providing a notification, such as an email, creating an SMF record, and the like to a user or administrator, providing an error message such as "RACF ICH408I," and the like. In some examples, the error message or flag received may provide sufficient information to correct the identified access error. In some examples, this verification of permissions may be performed automatically and without user interaction. For instance, once the records are collected they may be automatically transferred to the permissions verification system and verified. No additional user interaction may be needed.

Figure 4:
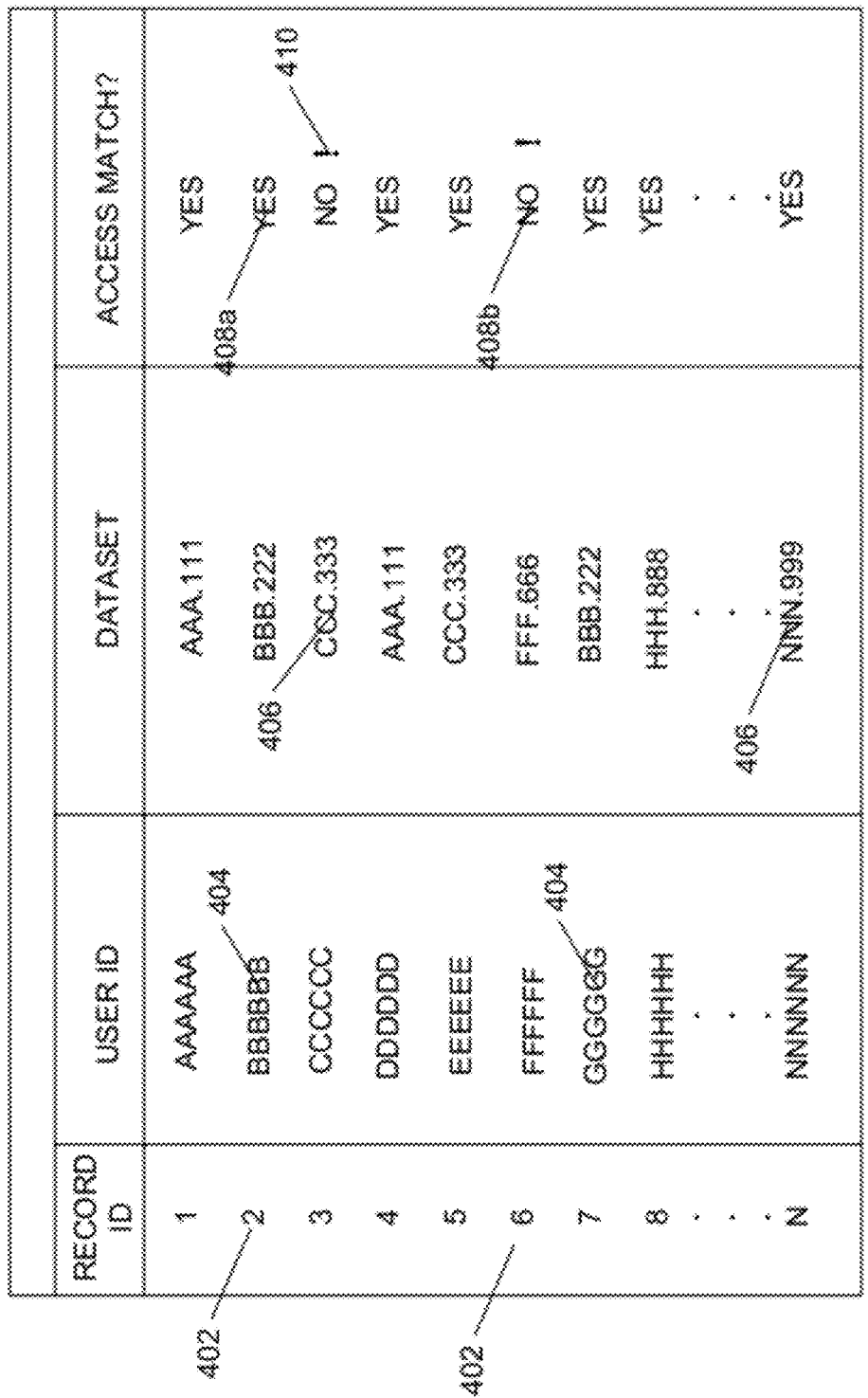
FIG. 4 illustrates an example listing of permissions in a mainframe system identifying permission errors according to one or more aspects described herein.

FIG. 4 illustrates one example listing 400 of records identifying permission or access errors. Each record includes a record number or record identifier 402. Each record is then associated with a user identifier 404. As discussed above, the user identifier may be an employee number, user identification code, and the like. In some examples, the records may be directed to a particular dataset 406. In other examples, the permission may be for the system in general, or another subset of information stored therein. The last column indicates whether the access level found in the record matches the access level in the revised mainframe system. If so, a yes will appear, as indicated in field 408a. If the permissions do not match, a no may appear, as in field 408b and a flag or other indicator of an error, such as indicator 410, may appear. In some instances, the flag or other indicator (e.g., output report, and the like) for invalid access attempt may be an error message for that system, such as "RACF ICH408I" message, which may provide sufficient information to correct the identified error. The information provided in the error message, such as "ICH408I," may include: user identifier (userid), access level requested to a given resource and the allowed access level the user identifier has to that resource. In some arrangements, if there is an error message, such as "ICH408I," the access requested is greater than the access allowed. If no error message appears, then the new system provided the correct access for that particular collected record.

Figure 5:
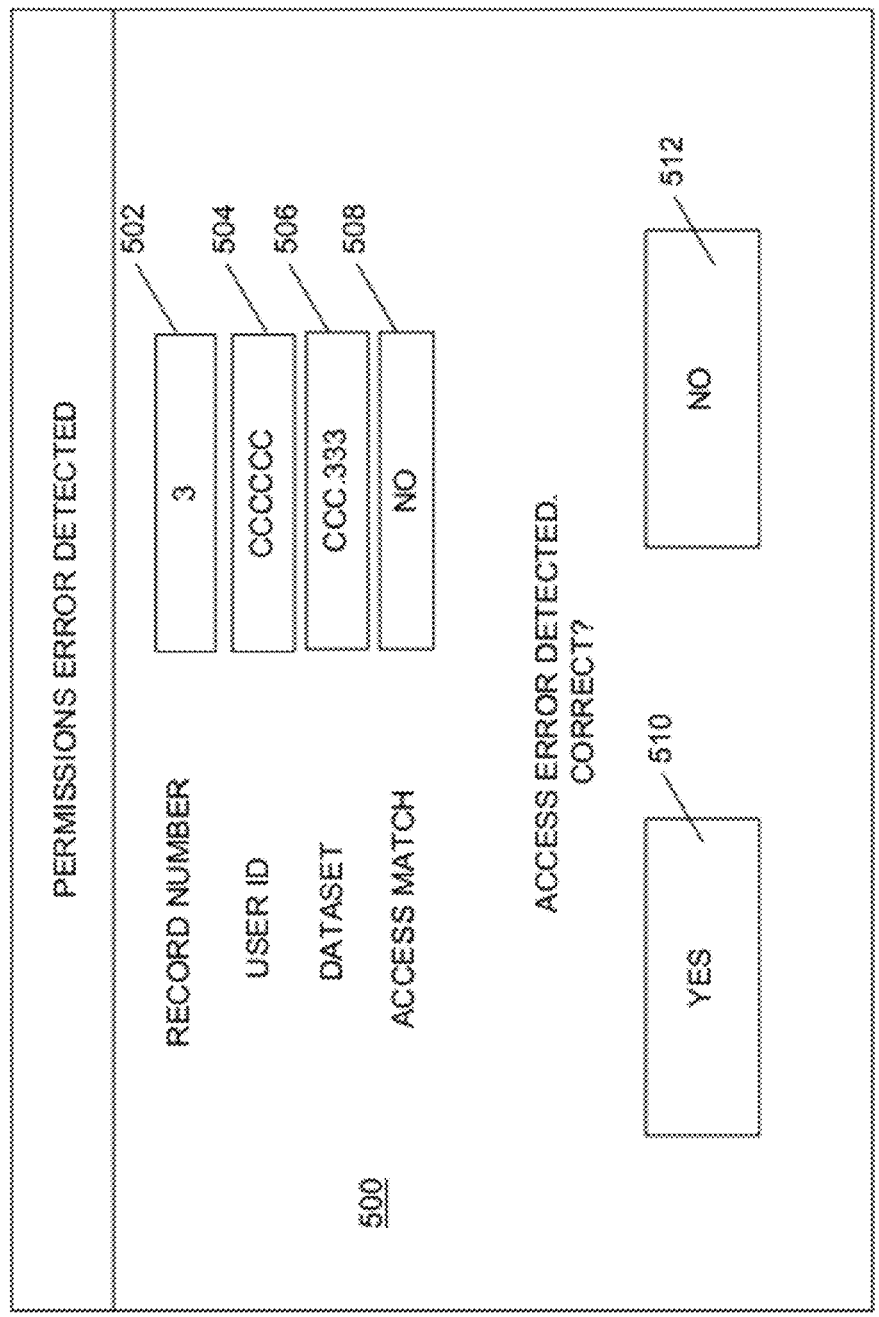
FIG. 5 illustrates an example user interface for identifying and correcting a permission error according to one or more aspects described herein.

FIG. 5 illustrates one example user interface that may be used to notify a user or administrator of an error in permissions, and or may be used to facilitate correction of the error. The user interface 500 includes a record number field 502 in which the record including the error may be identified. Interface 500 further includes the user identification number 504 associated with the erroneous permissions or access. In addition, interface 500 may include the dataset associated with the error in field 506. Field 508 may provide an indication that the permissions or access levels did not match. As discussed above, the indication may include a flag or error message.

In some examples, the user may then be prompted to correct the permission or access error. If the user desires to correct the error at that time, the user may select yes option 510. Selection of the yes option may prompt additional user interfaces that may guide the user through correction of the error. Alternatively, if the user does not desire to correct the error at that time, the no option 512 may be selected. In some examples, the user may be prompted at a later time to return to correct the error.

Figure 6:
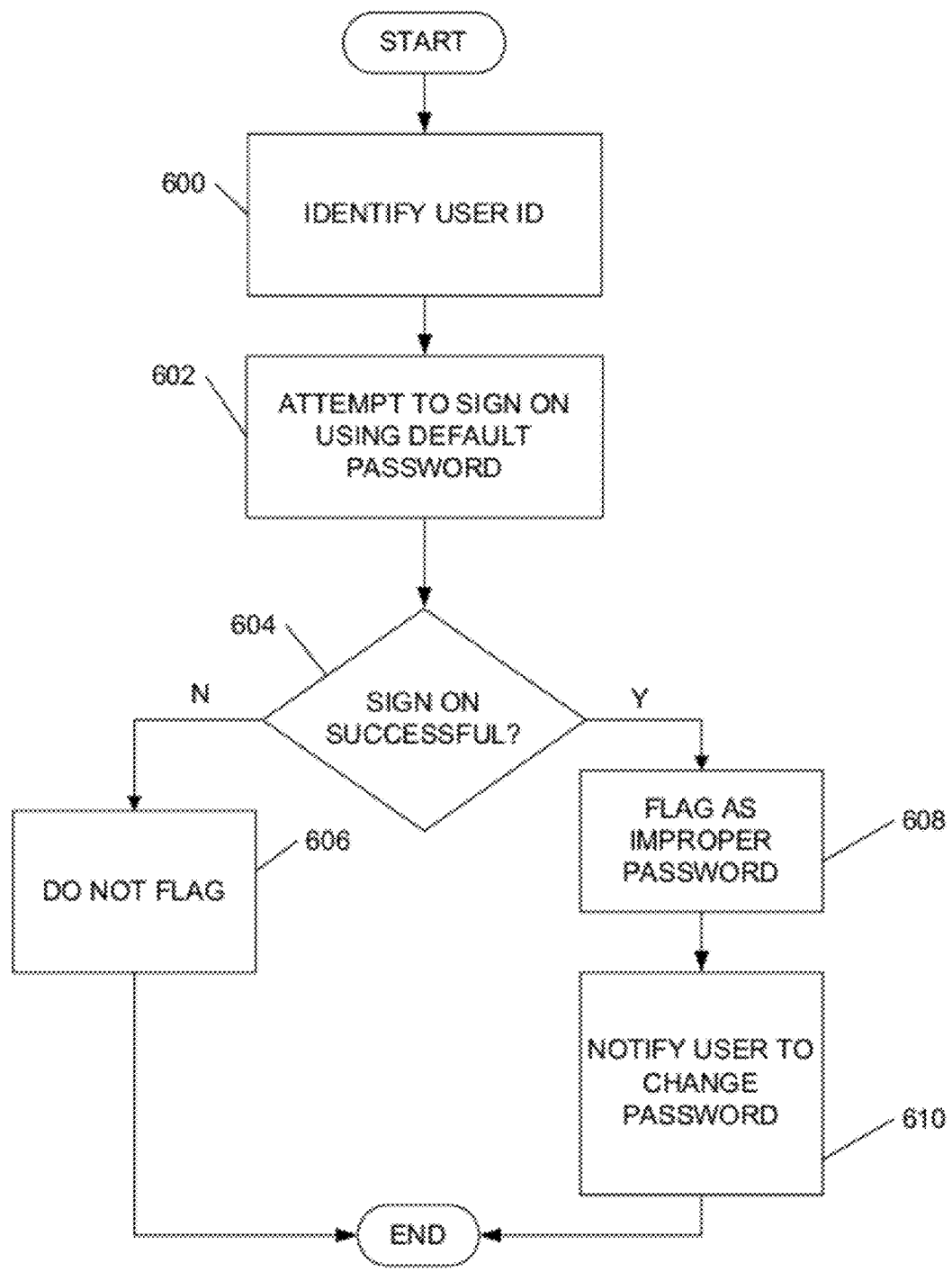
FIG. 6 illustrates an example method of identifying improper passwords in a mainframe system according to one or more aspects described herein.

FIG. 6 illustrates an example method for identifying improper passwords, such as on a mainframe system. For instance, in some examples, when a new user identification number or user identifier is created, it may include a default password. A default password may be a generic password that is identical for every user identifier created. The password for any RACF user identifier that is not given a specific password may be the default group of that user identifier. On other systems the default password may be the user identifier. For instance, user identifiers PROG, OPER, and $SRV on VM machines may also be the default password upon creation of the user identifier. In other examples, a default password may be unique to the user identifier but may be a known combination, such as the first initial and last name of the user, last four digits of the user's telephone extension, and the like. Once the user attempts a log in, the user may be prompted to change the password to something unique. In some instances, the default password may be the same for all new user identifiers created. Further, some users may choose not to change the password to something unique but rather may maintain the default password. This arrangement may lead to dihonest use of or unauthorized access to one or more systems. Thus, verification of user passwords being passwords other than the default password may reduce instances of dishonest use and/or unauthorized access.

In step 600, one or more user identifiers are identified. In some instances, a plurality of user identifiers, or even all user identifiers on a system, such as on a mainframe system, may be identified. In step 602 a system, such as the permissions verification system 208 in FIG. 2, may attempt to log on to the revised or existing mainframe system using one or more of the identified user identifiers and a default password. In step 604 a determination is made as to whether the sign on was successful. If not, then the password may remain and no flag or notification will be generated in step 606.

However, if the sign on was successful, that user identifier and default password may be flagged as improper in step 608 and the user associated with the identifier and password may be notified of the improper password and/or forced to change the password. In some examples, this verification of passwords may be done automatically and without user interaction.

In some arrangements, multiple potential default passwords may be included in an attempted login. Additionally or alternatively, common passwords or passwords not meeting a minimum level of security may also be attempted in order to identify passwords that should be upgraded to more secure passwords.

The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method, comprising:
receiving, at a permissions verification system, a plurality of records, the plurality of records comprising a first record that includes at least a user identifier and an associated first access level that indicates a level of access to a first mainframe system, and a second record that includes at least the user identifier and an associated second access level that indicates a level of access to a second mainframe system, wherein the first record is of a first format and the second record is of a second format, the second format differing from the first format;

determining, at the permissions verification system, that the first access level associated with the user identifier in the first record does not match the second access level associated with the user identifier in the second record, wherein determining that the first access level associated with the user identifier in the first record does not match the second access level associated with the user identifier in the second record comprises converting the first format of the first record and the second format of the second record to a common format; and responsive to determining that the first access level does not match the second access level, providing a notification of an inconsistency between the first access level and the second access level.

2. The method of claim 1, wherein providing the notification of the inconsistency includes a request to correct the inconsistency.

3. The method of claim 2, further including receiving a correction of the inconsistency and saving a corrected access level to the second mainframe system.

4. The method of claim 1, wherein the first mainframe system includes a plurality of mainframe systems.

5. The method of claim 1, wherein the plurality of records are collected over a predetermined period of time.

6. The method of claim 1, wherein the plurality of records are received from a plurality of systems.

7. One or more non-transitory computer readable media storing computer readable instructions that, when executed, cause an apparatus to:

receive a plurality of records, the plurality of records comprising a first record that includes at least a user identifier and an associated first access level that indicates a level of access to a first mainframe system, and a second record that includes at least the user identifier and an associated second access level that indicates a level of access to a second mainframe system, wherein the first record is of a first format and the second record is of a second format, the second format differing from the first format;

determine that the first access level associated with the user identifier in the first record does not match the second access level associated with the user identifier in the second record by converting the first format of the first record and the second format of the second record to a common format; and responsive to determining that the first access level does not match the second access level, provide a notification of an inconsistency between the first access level and the second access level.

8. The one or more non-transitory computer readable media of claim 7, wherein providing the notification of the inconsistency includes a request to correct the inconsistency.

9. The one or more non-transitory computer readable media of claim 8, further including instructions that, when executed, cause the apparatus to correct the inconsistency and save the corrected access level to the second mainframe system.

10. The one or more non-transitory computer readable media of claim 7, wherein the plurality of records are collected over a predetermined period of time.

11. An apparatus comprising:
a processor; and
memory operatively coupled to the processor and storing computer readable instructions that, when executed, cause the apparatus to:
receive a plurality of records, the plurality of records comprising a first record that includes at least a user identifier and an associated first access level that indicates a level of access to a first mainframe system, and a second record that includes at least the user identifier and an associated second access level that indicates a level of access to a second mainframe system, wherein the first record is of a first format and the second record if of a second format, the second format differing from the first format;

determine that the first access level associated with the user identifier in the first record does not match the second access level associated with the user identifier in the second record by converting the first format of the first record and the second format of the second record to a common format; and responsive to determining that the first access level does not match the second access level, provide a notification of an inconsistency between the first access level and the second access level.

12. The apparatus of claim 11, wherein providing the notification of the inconsistency includes a request to correct the inconsistency.

13. The apparatus of claim 12, further including instructions that, when executed, cause the apparatus to correct the inconsistency and save the corrected access level to the second mainframe system.

14. A method, comprising:

receiving, at a permissions verification system, a first user identifier;

attempting a first login to a mainframe system, by the permissions verification system, including inputting the first user identifier and a default password, the default password being a password provided upon creation of the first user identifier, and the default password comprising one or more of a generic password assigned by the mainframe system to each user identifier upon creation and the user identifier;

responsive to determining that the first login was successful, notifying a user associated with the first user identifier that the default password is associated with the first user identifier and does not meet a predetermined level of security;

responsive to determining that the first login was unsuccessful, attempting a second login to the mainframe system including inputting a second user identifier and the default password; and responsive to determining that the second login was successful, notifying a user associated with the second user identifier that the default password is associated with the second user identifier and does not meet the predetermined level of security.

15. The method of claim 14, wherein notification of the user associated with the first user identifier includes a request to change the password associated with the first user identifier.

* * * * *